[11] 3,603,687

| | | | |
|---|---|---|---|
| [72] | Inventor | Fromund Hock Wetzlar, Germany | |
| [21] | Appl. No. | 761,495 | |
| [22] | Filed | Sept. 23, 1968 | |
| [45] | Patented | Sept. 7, 1971 | |
| [73] | Assignee | Ernst Leitz GmbH Wetzlar, Germany | |
| [32] | Priority | Sept. 30, 1967 | |
| [33] | | Germany | |
| [31] | | P 16 23 502.2 | |

[54] ALIGNMENT TELESCOPE
3 Claims, 1 Drawing Fig.

[52] U.S. Cl. ............................................. 356/153,
350/33, 356/253
[51] Int. Cl. ................................................. G01b 11/27,
G02b 23/00
[50] Field of Search ..................................... 356/153,
247, 250, 252, 139, 171, 253, 254; 350/10, 33, 47,
54, 80, 232, 247, 286

[56] References Cited
UNITED STATES PATENTS

| 1,196,811 | 9/1916 | Rayton et al. .................. | 350/54 |
|---|---|---|---|
| 1,236,722 | 8/1917 | Lange ........................... | 350/54 |
| 2,682,804 | 7/1954 | Clifford et al. .................. | 356/253 |
| 2,843,013 | 7/1958 | Keuffel et al. .................. | 350/48 |
| 2,959,088 | 11/1960 | Rantsch ........................ | 350/10 |
| 3,068,741 | 12/1962 | Werner ......................... | 356/139 |
| 3,297,389 | 1/1967 | Gibson ......................... | 350/10 |
| 3,359,849 | 12/1967 | Friedman ..................... | 350/10 |
| 3,378,326 | 4/1968 | Alvarez ........................ | 356/247 |
| 2,055,684 | 9/1936 | Eppenstein ................... | 356/153 |
| 3,389,632 | 6/1968 | Plumer ......................... | 356/153 |

FOREIGN PATENTS

| 191,066 | 1964 | Sweden ........................ | 350/54 |
|---|---|---|---|
| 366,290 | 1923 | Germany ...................... | 356/153 |

*Primary Examiner*—Ronald L. Wibert
*Assistant Examiner*—J. Rothenberg
*Attorney*—Smyth, Roston, & Pavitt

ABSTRACT: An alignment telescope is disclosed using optically active members which can be tilted or shifted for line-of-sight displacement, but whereby the resulting angular deflection of the line of subject is compensated, for leaving only a residual lateral displacement thereof.

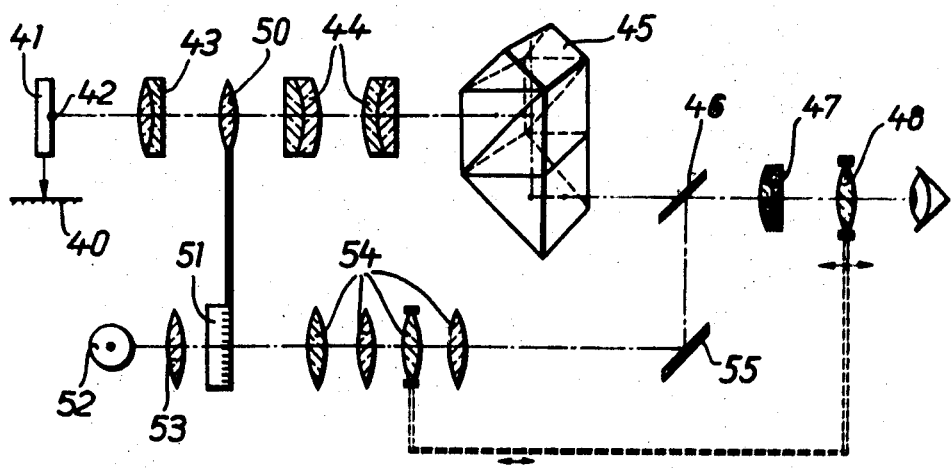

ALIGNMENT TELESCOPE

This invention relates to alignment telescopes and more particularly to improvements in alignment telescopes for measuring the parallel displacement of the alignment axis or line-of-sight, using virtual parallel displacement of entrance and/or exit pupil.

Alignment telescopes are usually employed to measure alignment and parallelism of workpieces or the like. Such a telescope usually employs a target marker such as a crosshair-type graticule located external to the telescope and coupled to the object or objects which are subject to the measurement, and this graticule is observed as a target through the telescope. The axis through a significant point of the target graticule and perpendicular to this (such as the intersection of the crosshairs) and running parallel to the aiming axis of the telescope is the target axis. The line of sight of the telescope must be displaced laterally so that the virtual image of the target axis appears to coincide, for example, with a significant point of the eyepiece system. This reference axis is defined, for example, by means of another graticule, in the telescope itself and observed through the eyepiece.

The U.S. Letters Pat. No. 2,682,804 discloses an alignment telescope having a plane-parallel plate for parallel displacement of the line-of-sight. The plate is tiltably mounted between the two imaging systems, eyepiece and objective, of the alignment telescope. The plate is tilted until the image of the target graticule appears superimposed upon the telescope graticule as observed through the eyepiece.

It is an object of the present invention to provide a different arrangement for an alignment telescope having at least one telescopic imaging system, for obtaining a parallel displacement of the alignment axis or line-of-sight and for measuring this displacement as representative of a misalignment of a target axis. It is a particular object of the invention to virtually parallelly displace entrance and/or exit pupil of the optical system and to ascertain therefrom misalignment of the target axis. It is known that the optical axis in an optical system is angularly deflected and tilted when a lens in the optical system is shifted or tilted. A continuous shifting displacement or tilting of a lens exhibits effects similar to those produced by a continuously variable glass wedge. It is a feature of the invention to employ this effect twice so as to compensate the undesired beam angular deflection and to obtain the desired parallel displacement as a residual lateral shift of the entrance and/or exit pupil so as to align the image of a target graticule with a fixed graticule between eyepiece and objective. The pupil displacement can also be obtained by means of a lens placed in the common focal plane of a telescopic system having two members with positively refracting power.

An alignment telescope having at least one telescopic imaging system is improved in accordance with the present invention in that a single, field lens is disposed between eyepiece and objective, which lens is tiltable or shiftable, perpendicular to the ray path between eyepiece and objective. The amount of shifting necessary to align the virtual image of the misaligned target axis represents that misalignment. Jointly displaced lenses can be coupled by means of lever means or they can be mounted in a ball ring and the position of lever means or of the ball ring is ascertained for measuring the displacement of the line-of-sight.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

The FIGURE illustrates the optical system of a telescope having a single member displacement system in accordance with the invention.

An arrangement is illustrated in the FIGURE wherein in dependence upon scanning an object 40, an alignment or target marker 42, mounted on a carrier 41, is displaced, i.e., misaligned, and this displacement and misalignment is to be measured. A telescope for observing the marker 42 is comprised of an objective lens system 43 and of an ocular or eyepiece 44. A Koester alignment prism 45 is positioned next to the eyepiece which permits direct visual observation of the image of marker 42 through a semitransparent mirror 46, as well as through a focusable telescope, comprised of the elements 47 and 48.

A field lens 50 is disposed between objective lens 43 and eyepiece 44. Lens 50 is particularly disposed in the common focal plane of lens 43 and 44. The position of lens 50 can be changed laterally, i.e., in direction perpendicular to the light path between objective lens 43 and eyepiece 44. Lens 50, if shifted, displaces the image of the entrance pupil. Lens 50 is stiffly coupled to a scale or scaling grid 51, which, in turn, is disposed on a red filter. The filter is illuminated by means of a lamp 52 through a condenser lens 53. The measuring scale position represents the line-of-sight displacement in the alignment telescope by operation of shifted lens 50. The position of scale or grid 51, i.e., the representation of the desired measuring value, is introduced into the main observation ray path by means of an optical system 54, by a mirror 55 and by the semitransparent mirror 46. The imaging system 54 is a variable system with constant magnification to permit sharp focusing of the images of scale or grid 51 for visual observation. The (axially) movable member of system 54 is coupled to the axially movable eyepiece 48 of the principal imaging and observation system. Therefore, system 54 and eyepiece 48 are adjusted in unison for common focusing operation of the two respective superimposed images of scale and alignment marker as seen through the eyepiece.

The invention is not limited to the embodiments described above, but all changes and modifications thereof not constituting departures from the spirit and scope of the invention are intended to be covered by the following claims:

1. In a telescope alignment system having an optical telescopic imaging system having an optical axis for imaging rays along that axis, including a ray path for nonparallel imaging rays, there being a field lens disposed in the nonparallel ray path, for displacement transverse to the optical axis, there being means to measure the displacement of the field lens, the improvement comprising:
    an alignment of the Koester variety disposed at the exit side of the telescopic system; and
    an auxiliary telescope adjustable as to focusing thereof and being disposed relative to the exit side of the prism for observation of an image as produced by the first telescopic imaging system, through the prism.

2. In an alignment system as in claim 1, the measuring means including means defining a scale connected to the field lens to follow lateral displacement thereof; and
    reflecting means disposed to superimpose an image of the scale upon the image as observed through the auxiliary telescope.

3. In an alignment system as in claim 2, and including an additional imaging system with optical axis for the scale and disposed to provide an image to be observed through the auxiliary telescope, the additional imaging system and the auxiliary telescope each having a lens adjustable along the respective optical axis, the two lenses being fixedly interconnected for adjustment in unison.